(12) United States Patent
Watanabe et al.

(10) Patent No.: US 6,726,380 B2
(45) Date of Patent: Apr. 27, 2004

(54) CAMERA BLADE DRIVING DEVICE

(75) Inventors: Nobuaki Watanabe, Tokyo (JP); Tohru Eguro, Tokyo (JP); Shigeru Yamagishi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/647,286

(22) Filed: Aug. 26, 2003

(65) Prior Publication Data

US 2004/0042786 A1 Mar. 4, 2004

(30) Foreign Application Priority Data

Aug. 30, 2002 (JP) ...................... 2002-252390

(51) Int. Cl.$^7$ ................................ G03B 9/08
(52) U.S. Cl. ...................... 396/463; 396/508
(58) Field of Search ................. 396/449, 452, 396/463, 470, 493–502, 508

(56) References Cited

U.S. PATENT DOCUMENTS

| 4,119,986 | A | * | 10/1978 | Koyama et al. | ............ | 396/463 |
| 5,173,728 | A | * | 12/1992 | Sangregory et al. | ........ | 396/454 |
| 6,443,635 | B1 | * | 9/2002 | Matsumoto et al. | ........ | 396/463 |

FOREIGN PATENT DOCUMENTS

| JP | 7-234434 | 9/1995 |
| JP | 2002-55376 | 2/2002 |

* cited by examiner

*Primary Examiner*—David M. Gray
(74) *Attorney, Agent, or Firm*—Wenderoth, Lind & Ponack, L.L.P.

(57) ABSTRACT

A camera blade driving device for use in a camera has a base plate having an exposure aperture; a blade supported pivotably on a supporting shaft on the base plate and capable of blocking part or all of light passing through the aperture while facing the aperture; and an electromagnetic actuator for driving the blade. The electromagnetic actuator has a frame member joined to the base plate; a rotor one end of which is supported by the frame member and an opposite end of which is supported by the base plate, the rotor having a driving pin by which a driving force is exerted onto the blade and rotating within a predetermined angular range; a magnetizing coil wound onto the frame member and the base plate; and a yoke provided outside the coil substantially coaxially with the rotor. With this structure, a fastening component like a screw is not needed, the number of components can be lessened, the structure can be simplified, costs can be reduced, and the driving device can be reduced in thickness, unlike a conventional device.

7 Claims, 12 Drawing Sheets

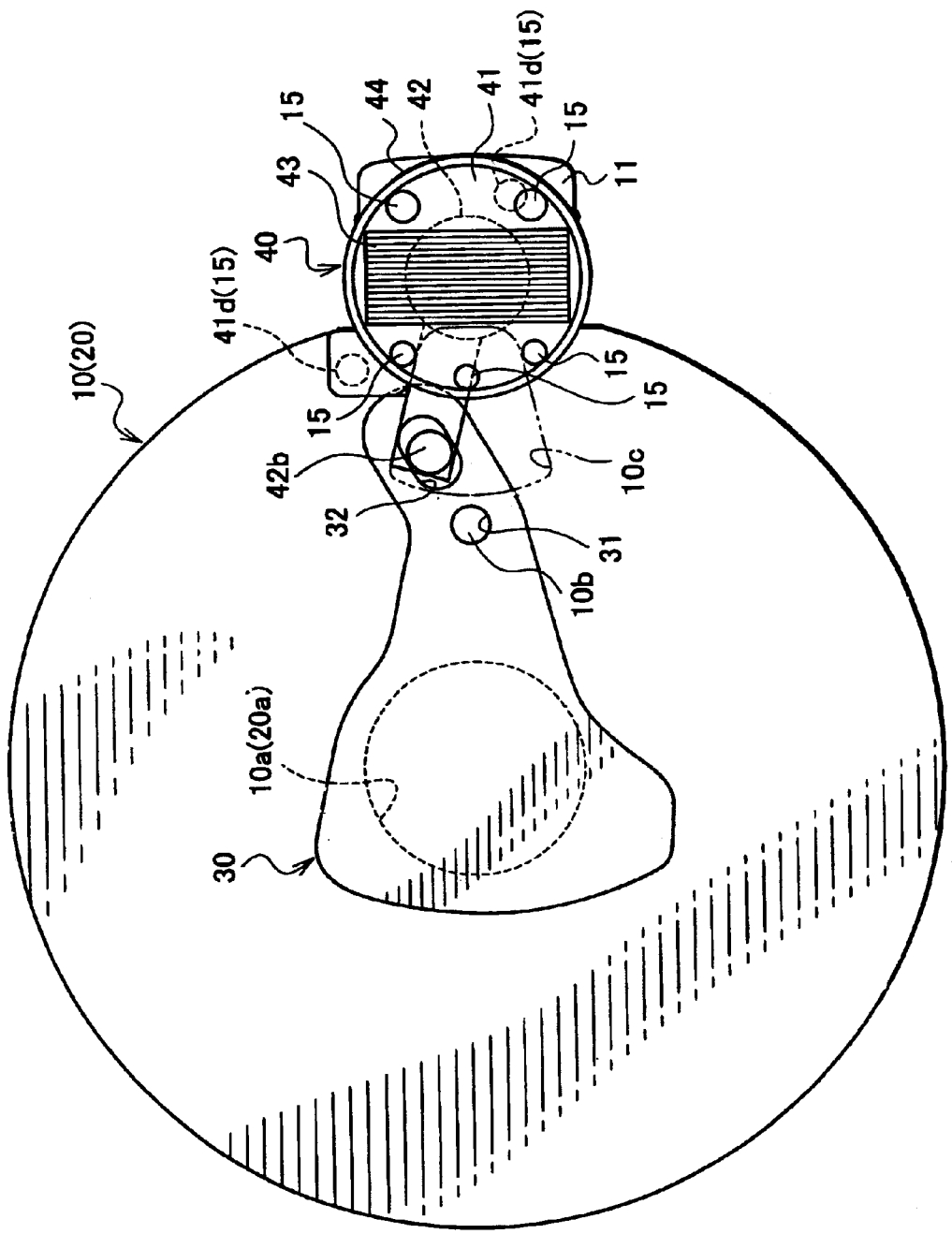

CAMERA BLADE DRIVING DEVICE

BACKGROUND OF THE INVENTION

1. Field of the Invention

The present invention relates to a camera blade driving device that is carried, for example, on a camera and that is capable of blocking part or all of light passing through an exposure aperture, and more particularly to a camera blade driving device that has an electromagnetic actuator including a rotor by which a blade is driven.

2. Description of the Related Art

As an example of a conventional camera blade driving device for use in a camera, there is known a driving device in which an electromagnetic actuator, which is made Up of upper and lower frame members coupled to each other for rotatably supporting a rotor, a magnetizing coil wound onto the upper and lower frame members, a cylindrical yoke attached to the upper frame member, etc., is joined to a base plate having an exposure aperture by means of, for example, a screw and by which a shutter blade is opened and closed or is driven to stop down the aperture (see Japanese Unexamined Patent publication No. 2002-55376).

In this conventional device, the electromagnetic actuator is pre-unitized and is joined to the base plate, which is individually prepared, by means of a screw or the like. Therefore, since an assembly step of preassembling only the electromagnetic actuator and an attachment step of attaching the electromagnetic actuator that has been assembled to the base plate when the device is manufactured are required, the manufacturing procedure becomes complicated, and, since the electromagnetic actuator is pre-unitized, the number of constituent elements rises, and, as a result, the device is increased in cost, is complicated in structure, and is increased in size.

The present invention has been made in consideration of the problems of the conventional device. It is therefore an object of the present invention to provide a camera blade driving device that is simplified in manufacturing processes, is simplified in structure, is reduced in size, and is suitable especially for a small digital camera by reducing the number of constituent elements to the utmost.

SUMMARY OF THE INVENTION

A camera blade driving device of the present invention that achieves the aforementioned object has a base plate having an exposure aperture; a blade supported pivotably on a supporting shaft on the base plate and capable of blocking part or all of light passing through the aperture while facing the aperture; and an electromagnetic actuator for driving the blade; the electromagnetic actuator having a frame member joined to the base plate; a rotor one end of which is supported by the frame member and an opposite end of which is supported by the base plate, the rotor having a driving pin by which a driving force is exerted onto the blade and rotating within a predetermined angular range; a magnetizing coil wound onto the frame member and the base plate; and a yoke provided outside the coil substantially coaxially with the rotor.

According to this structure, the rotor is rotatably supported by the frame member and the base plate, and the coil is wound onto the frame member and the base plate. Therefore, the electromagnetic actuator can be simultaneously assembled in a step of attaching various components to the base plate. In other words, unlike the conventional device, the number of necessary frame members is only one, and a fastening component, such as a screw, is not needed since the coil is wound onto the frame member and the base plate while rotatably supporting the rotor. Therefore, the number of components can be lessened, the structure can be simplified, and costs can be reduced. Additionally, the electromagnetic actuator can be simplified in structure and be reduced in height, and, accordingly, the device can be reduced in size and in thickness.

The aforementioned device may be structured such that one of the frame member and the base plate has a fitting convex portion used to connect the two components by fitting, and the other one of the frame member and the base plate has a fitting concave portion to accept the fitting convex portion.

According to this structure, the frame member can be connected to the base plate while being positioned with respect thereto merely by fitting the fitting convex portion into the fitting concave portion, and an attachment process can be easily performed.

The aforementioned device may be structured such that the base plate has a projection that protrudes outward in a radial direction with respect to the aperture, and the frame member is connected to the projection so as to rotatably support the rotor in cooperation with the projection, and the coil is wound onto the projection and the frame member so as to fasten the frame member to the projection.

According to this structure, the coil is wound so as to fasten the frame member to the projection in the state where the frame member is connected to the projection of the base plate, and the rotor is rotatably supported, and therefore the coil can be easily wound, and the frame member can be firmly connected to the base plate without a dedicated screw.

The aforementioned device may be structured such that the rotor is disposed so that a center of an angular range where the rotor rotates is situated substantially on a straight line passing through the center of the aperture and extending in the radial direction, and the coil is wound in a direction substantially perpendicular to the straight line.

According to this structure, the angular range where the rotor can rotate can be greatly set while employing the structure in which the frame member is connected to the base plate, and the coil is wound onto the frame member and the base plate.

The aforementioned device may be structured such that the blade is a single shutter blade or a single diaphragm blade used to open and close the aperture, and the driving pin is connected directly to the single shutter blade or the single diaphragm blade.

According to this structure, the driving pin directly drives the single shutter blade or the single diaphragm blade by rotation of the rotor, and the single shutter blade or the single diaphragm blade opens and closes the aperture or performs stopping-down/nonstopping-down. Therefore, the structure can be simplified, and it is possible to obtain a small-sized camera shutter device or a small-sized camera diaphragm device having a small height (a small thickness), which is suitable for, e.g., a digital camera.

The aforementioned device may be structured such that the blade is a pair of shutter blades or a pair of diaphragm blades used to open and close the aperture, and the driving pin is connected to the pair of shutter blades or the pair of diaphragm blades through a connecting arm swingably supported by the base plate.

According to this structure, the driving pin drives the pair of shutter blades or the pair of diaphragm blades by rotation of the rotor through the connecting arm. Therefore, the structure can be simplified, and it is possible to obtain a small-sized camera shutter device or a small-sized camera diaphragm device having a small height (a small thickness), which is suitable for, e.g., a digital camera.

Also, a camera blade driving device of the present invention that achieves the aforementioned object has a base plate having an exposure aperture; a blade supported pivotably on a supporting shaft on the base plate and capable of blocking part or all of light passing through the aperture while facing the aperture; and an electromagnetic actuator for driving the blade; the electromagnetic actuator having a frame member joined to the base plate; a rotor one end of which is supported by the frame member and an opposite end of which is supported by the base plate, the rotor having a driving pin by which a driving force is exerted onto the blade and rotating within a predetermined angular range; and a magnetizing coil wound onto the frame member and the base plate.

According to this structure, the rotor is rotatably supported by the frame member and the base plate, and the coil is wound onto the frame member and the base plate. Therefore, the electromagnetic actuator can be simultaneously assembled in a step of attaching various components to the base plate. In other words, unlike the conventional device, the number of necessary frame members is only one, and a fastening component, such as a screw, is not needed since the coil is wound onto the frame member and the base plate while rotatably supporting the rotor. Therefore, the number of components can be lessened, the structure can be simplified, and costs can be reduced. Additionally, the electromagnetic actuator can be simplified in structure and be reduced in height, and, accordingly, the device can be reduced in size and in thickness.

BRIEF DESCRIPTION OF THE DRAWINGS

FIG. 3 is a plan view that shows a state where the shutter blade closes the aperture in the device of FIG. 1.

DETAILED DESCRIPTION OF THE PREFERRED EMBODIMENTS

Preferred embodiments of the present invention will be hereinafter described with reference to the accompanying drawings. FIG. 1 through FIG. 5B show a camera shutter device as one embodiment of a camera blade driving device for use in a camera according to the present invention.

Figure 1:
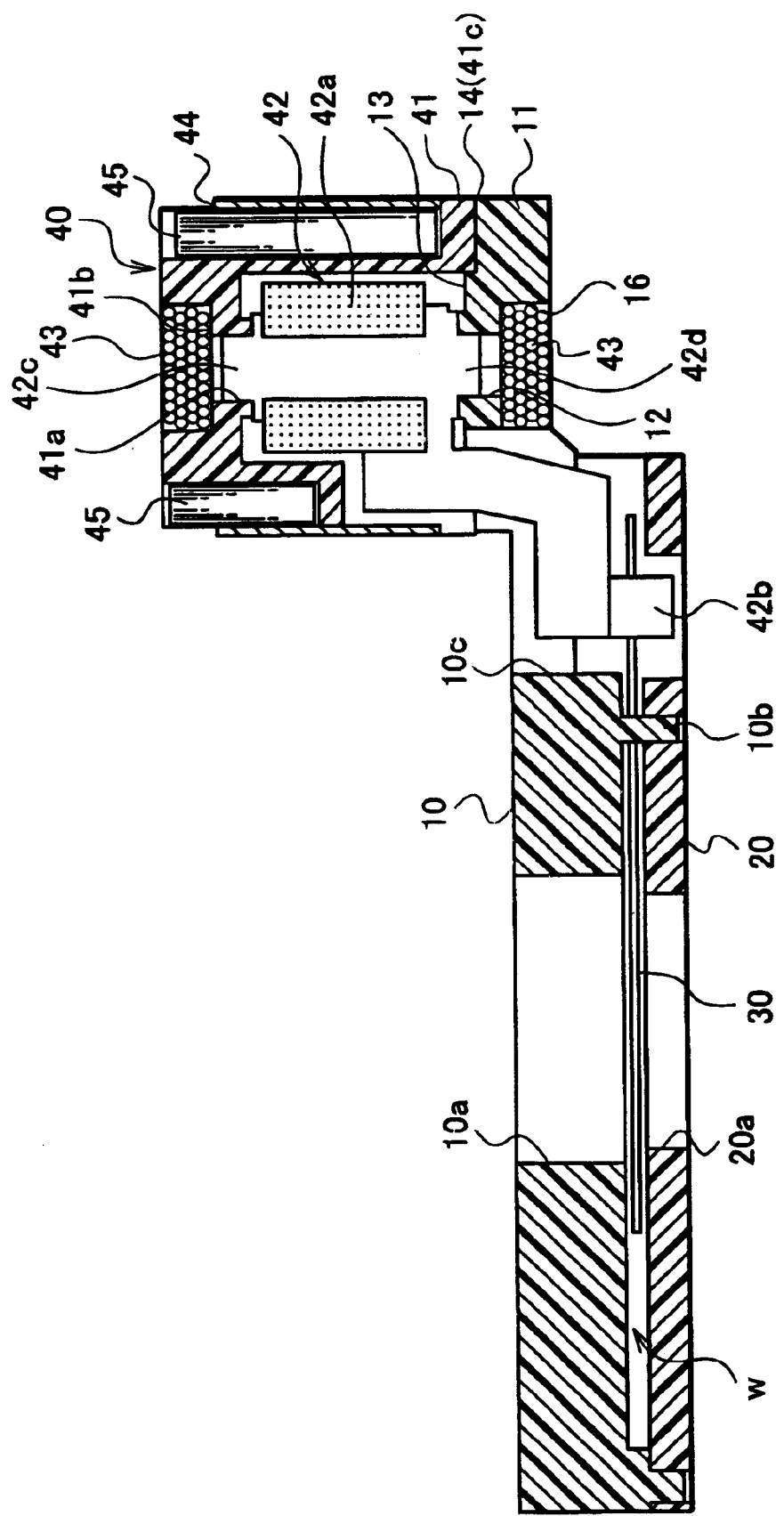
FIG. 1 is a side sectional view that shows one embodiment of a camera blade driving device for use in a camera according to the present invention.

As shown in FIG. 1, this device has a main plate 10 and a back plate 20 that constitute a base plate having exposure apertures 10a and 20a, a single shutter blade 30 supported pivotably on a supporting shaft 10b on the main plate 10 and serving as a blade that blocks light passing through the apertures 10a and 20a while facing the apertures 10a and 20a, and an electromagnetic actuator 40 that drives the shutter blade 30.

Figure 2:
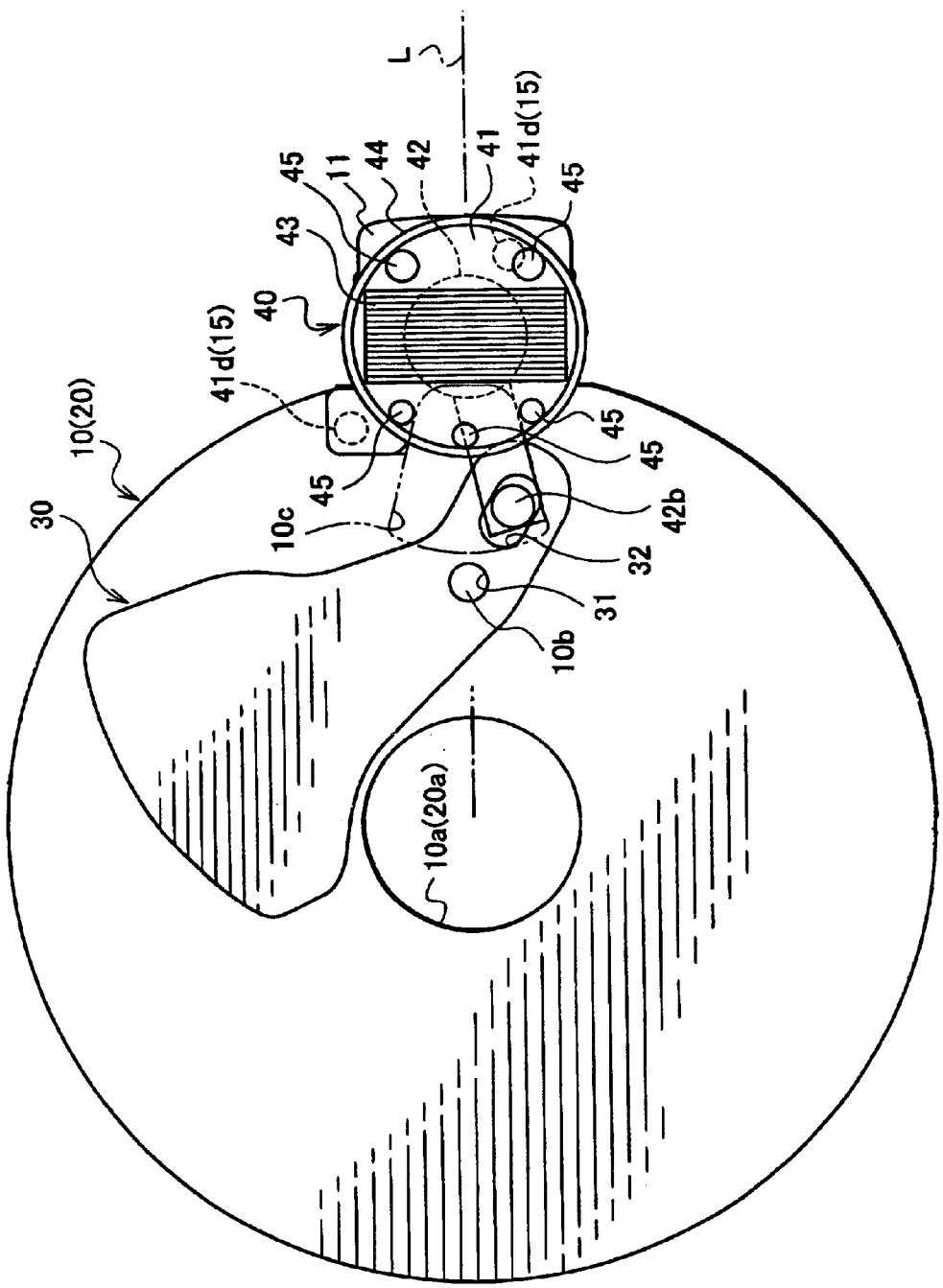
FIG. 2 is a plan view that shows a state where the shutter blade opens the aperture in the device of FIG. 1.

As shown in FIG. 2 and FIG. 3, the main plate 10 serving as a base plate is shaped like a substantially circular disk. A flat projection 11 that protrudes outward in the radial direction with respect to the aperture 10a is formed integrally with a part of the outline thereof. A substantially sectorial through-hole 10c is formed inside the projection 11.

Figure 4A:
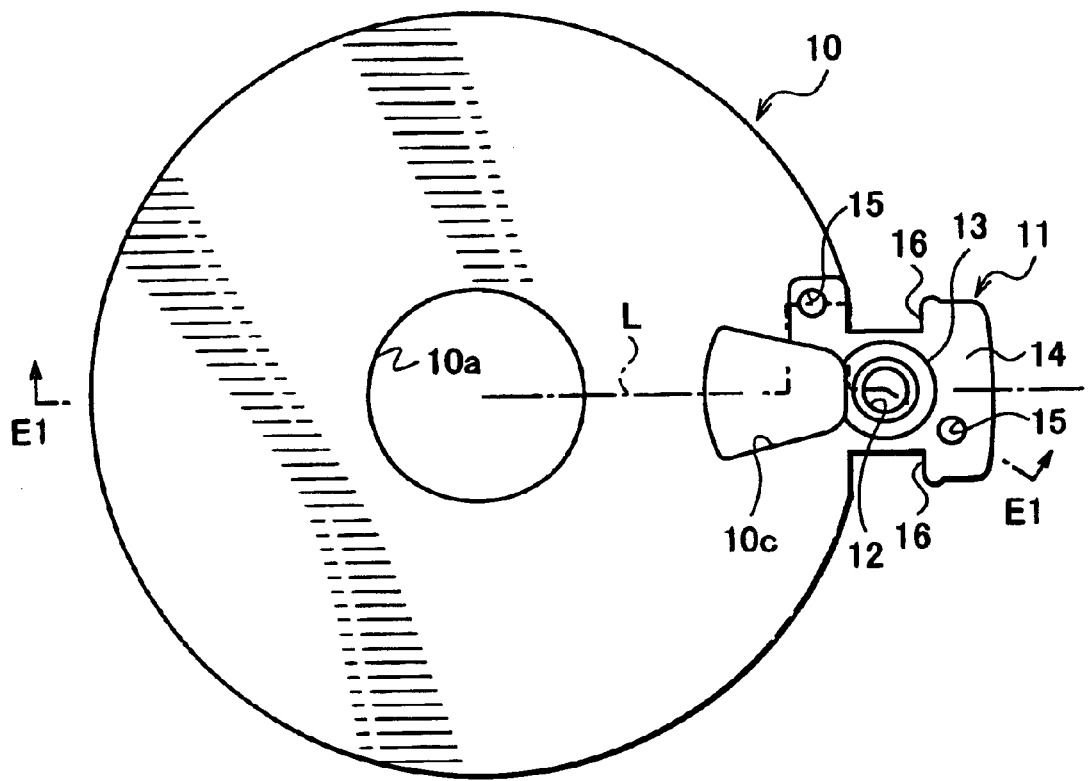
FIG. 4A is a plan view showing the base plate (main plate) serving as an element of the device of FIG. 1.
Figure 4B:
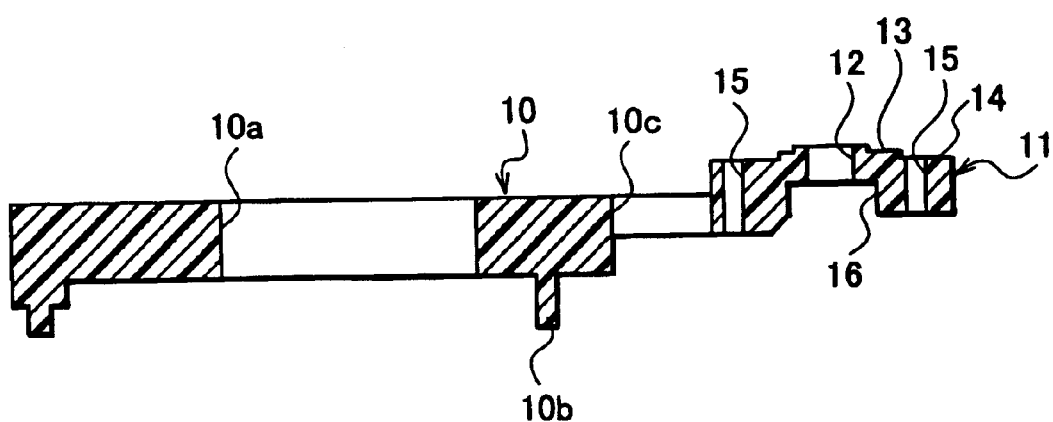
FIG. 4B is a sectional view along E1—E1 of FIG. 4A.

As shown in FIGS. 4A and 4B, at the projection 11 and in the vicinity of the projection 11, respectively formed are a bearing hole 12 that supports an end 42d of a rotor 42 described later, an annular convex portion 13 serving as a fitting convex portion located around the bearing hole 12, a flat joint surface 14 located around the annular convex portion 13, two fitting holes 15 each serving as a fitting concave portion located in the joint surface 14, and a wind groove 16 onto which a coil 43 described later is wound. The back plate 20 serving as a base plate is joined to the main plate 10 with a predetermined interval as shown in FIG. 1, and whereby a blade chamber W that can contain the shutter blade 30 is defined.

As shown in FIG. 1 through FIG. 3, the single shutter blade 30 has a circular hole 31 and a long hole 32. The supporting shaft 10b is inserted into the circular hole 31, and a driving pin 42b described later is inserted into the long hole 32. Accordingly, the shutter blade 30 supported pivotably on the supporting shaft 10b can open and close the aperture 10a by allowing the driving pin 42b to reciprocate within a predetermined range.

As shown in FIG. 1 through FIG. 3, the electromagnetic actuator 40 is made up of a frame member 41 connected to the main plate 10, the rotor 42 having the driving pin 42b and a magnet portion 42a magnetized to have N and S poles, the magnetizing coil 43, a cylindrical yoke 44 disposed coaxially with the rotor 42, and iron pins 45.

Herein, the yoke 44, which is attached to the frame member 41 outside the coil 43, is used to form a magnetic path, and the iron pins 45 are used to exert a magnetic attraction force to the rotor 42.

Figure 5A:
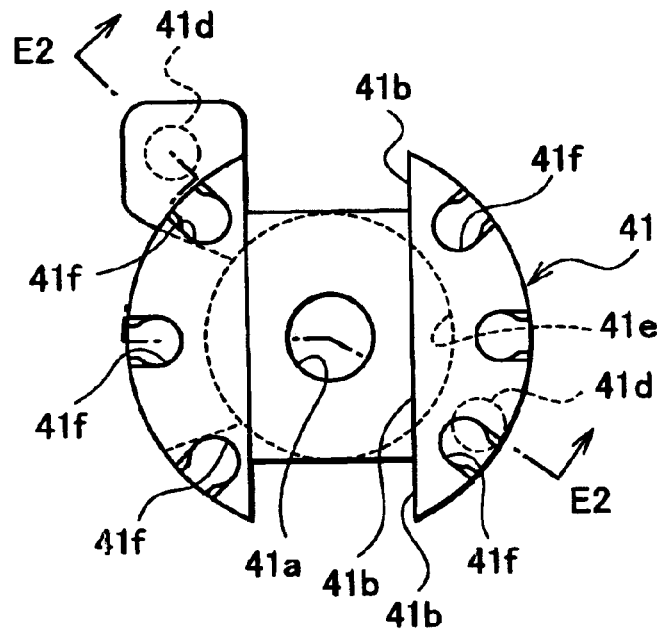
FIG. 5A is a plan view showing the frame member serving as an element of the device of FIG. 1.
Figure 5B:
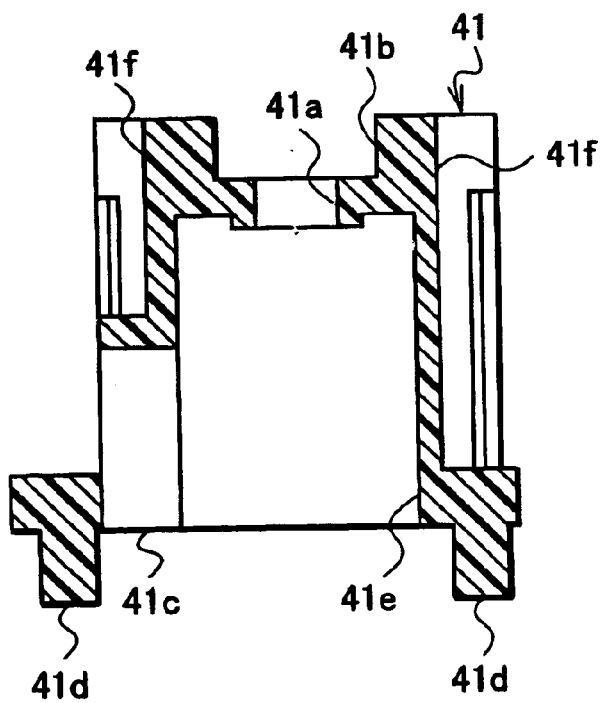
FIG. 5B is a sectional view along E2—E2 of FIG. 5A.

As shown in FIG. 1 and FIGS. 5A and 5B, the frame member 41 has a bearing hole 41a that supports an end 42c of the rotor 42, a wind groove 41b onto which the coil 43 is wound, a joint surface 41c joined to the joint surface 14 of the main plate 10, two fitting pins 41d each serving as a fitting convex portion that protrudes from the joint surface 41c, a fitting hole 41e serving as a fitting concave portion that is fitted into the annular convex portion 13, and concave portions 41f to which the iron pins 45 are attached.

In order to attach the frame member 41, the other end 42d of the rotor 42 is inserted into the bearing hole 12 of the projection 11, and the end 42c of the rotor 42 is inserted into the bearing hole 41a of the frame member 41 so that the rotor 42 is rotatably supported. The frame member 41 is then connected to the projection 11 of the main plate 10 by fitting the fitting pins 41d into the fitting holes 15 and by fitting the annular convex portion 13 into the fitting hole 41e.

Since a slightly tight fitting state is created between the fitting pins 41d and the fitting holes 15 and between the annular convex portion 13 and the fitting hole 41e at this time, the frame member 41 is firmly connected to the projection 11 while being positioned with respect thereto.

In this connected state, the rotor 42 can rotate within a predetermined angular range, i.e., within a range where the driving pin 42b is restricted by the sectorial through-hole 10b.

Since the rotor 42 is rotatably supported by the frame member 41 and the base plate (main plate) 10 (projection 11), and the coil 43 is wound onto the frame member 41 and the base plate (main plate) 10 (projection 11) as mentioned above, the electromagnetic actuator 40 can be simultaneously assembled in a step of attaching various components to the main plate 10.

In other words, unlike the conventional device, the number of necessary frame members is only one, and a fastening component like a screw is not needed, because the frame member 41 is joined to the main plate 10 by fitting and is further fastened by the coil 43. Therefore, the number of components can be lessened, the structure can be simplified, costs can be reduced, and the structure of the electromagnetic actuator 40 can be simplified to reduce its height. Therefore, the driving device can be reduced in size (in thickness).

As shown in FIG. 4A, the center of the angular range (i.e., the sectorial through-hole 10c) with in which the rotor 42 (the driving pin 42b) rotates is designed to exist substantially on a straight line L passing through the center of the aperture 10a and extending in the radial direction. Therefore, the rotor 42 can rotate rightward and leftward at substantially equal angles, respectively, with the straight line L as the boundary therebetween.

As shown in FIG. 1 through FIG. 4B, the coil 43 is wound in the wind grooves 41 and 16 in such a way as to surround the end 42c and the other end 42d of the rotor 42 from above and below in a direction substantially perpendicular to the straight line L in a state where the frame member 41 is connected to the projection 11 of the main plate 10. As a result, the frame member 41 is fastened to the main plate 10.

As mentioned above, the rotor 42 is disposed so that the center of the angular range where the rotor 42 rotates exists substantially on the straight line L passing through the center of the aperture 10a and extending in the radial direction, and the coil 43 is wound in the direction substantially perpendicular to the straight line L. Therefore, the angular range where the rotor 42 rotates can be set to be greater.

Next, a brief description will be given of the operation of the driving device in a case in which the device is carried on a digital camera. As shown in FIG. 2, the rotor 42 is first situated at a counterclockwise rotational end and is held by a magnetic urging force of, for example, the iron pin 45 (a magnetic attraction force generated between the rotor 42 and the iron pins 45) when the coil 43 is not energized. At this time, the shutter blade 30 opens the apertures 10a and 20a.

When a photographer releases the shutter in this standby state, the coil 43 is energized, and the rotor 42 rotates as shown in FIG. 3, so that the shutter blade 30 closes the apertures 10a and 20a. An exposure operation is performed by a closing movement of the shutter blade 30, a photographic image taken by a CCD is then subjected to various processings and is stored in a storage unit, and the photography is completed. Thereafter, the rotor 42 rotates in an opposite direction by passing the electric current in the opposite direction, and the shutter blade 30 returns to the position to open the apertures 10a and 20a and is held there.

Figure 6:
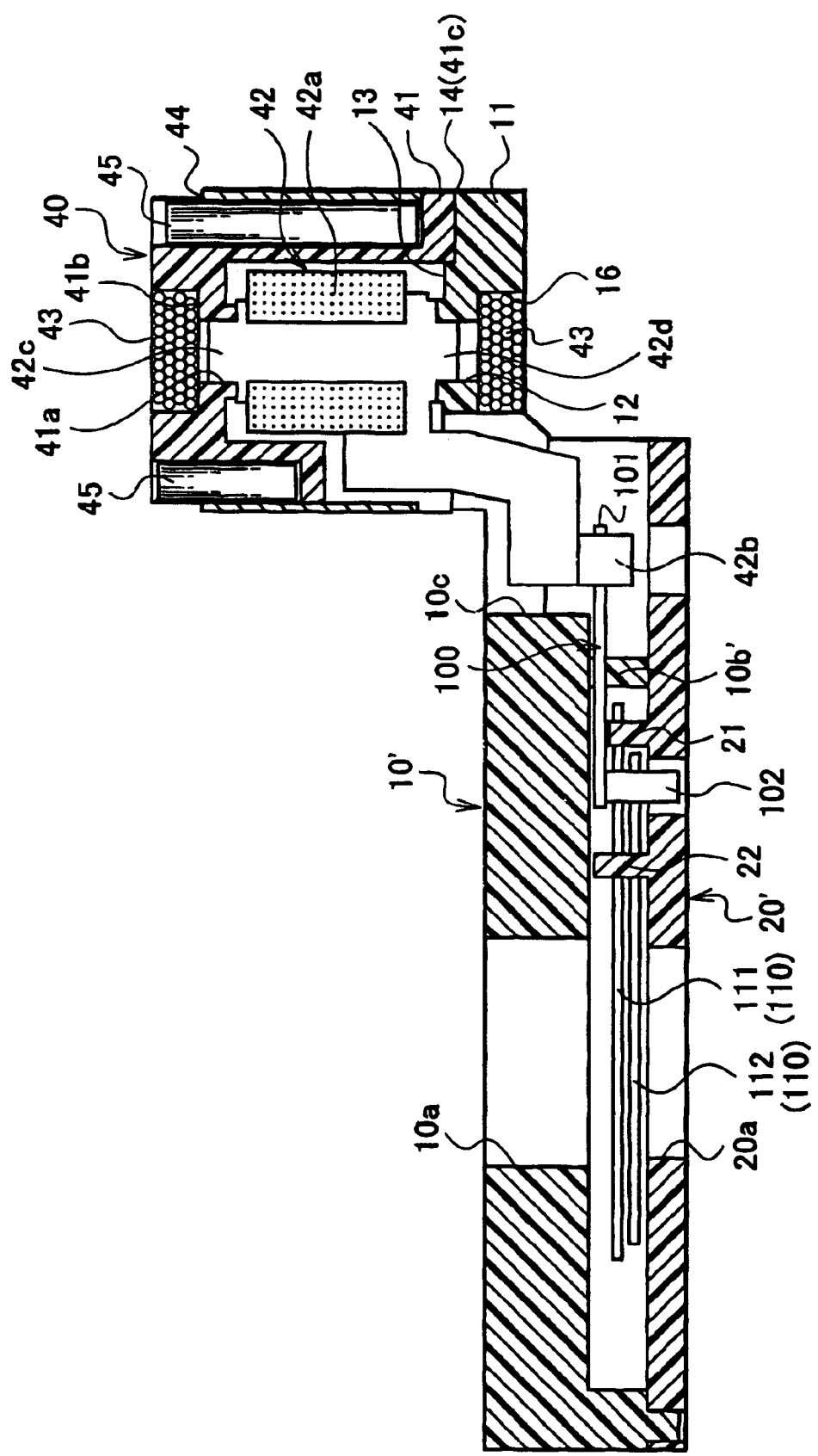
FIG. 6 is a side sectional view that shows another embodiment of a camera blade driving device according to the present invention.
Figure 7:
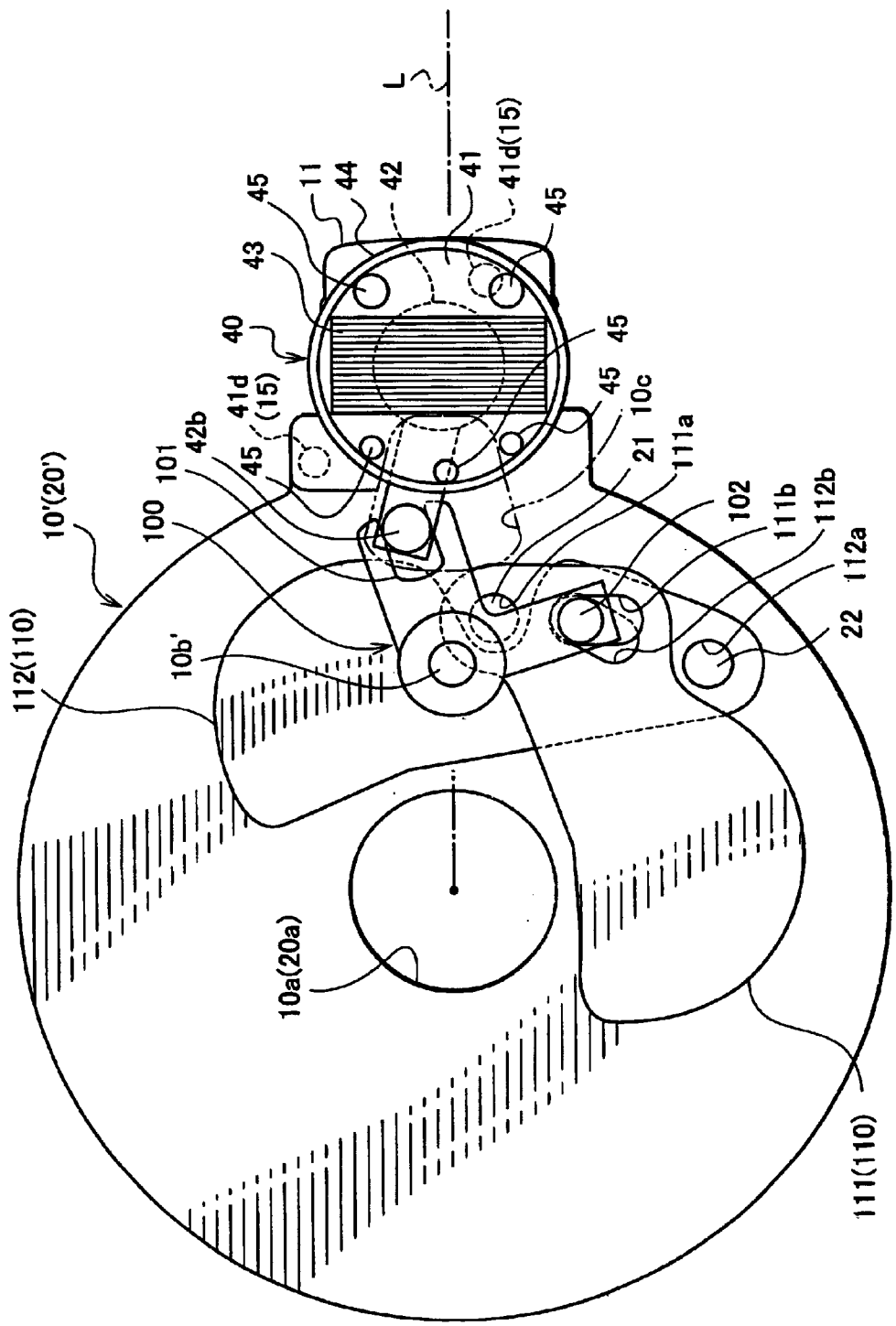
FIG. 7 is a plan view that shows a state where the pair of shutter blades open the aperture in the device of FIG. 6.
Figure 8:
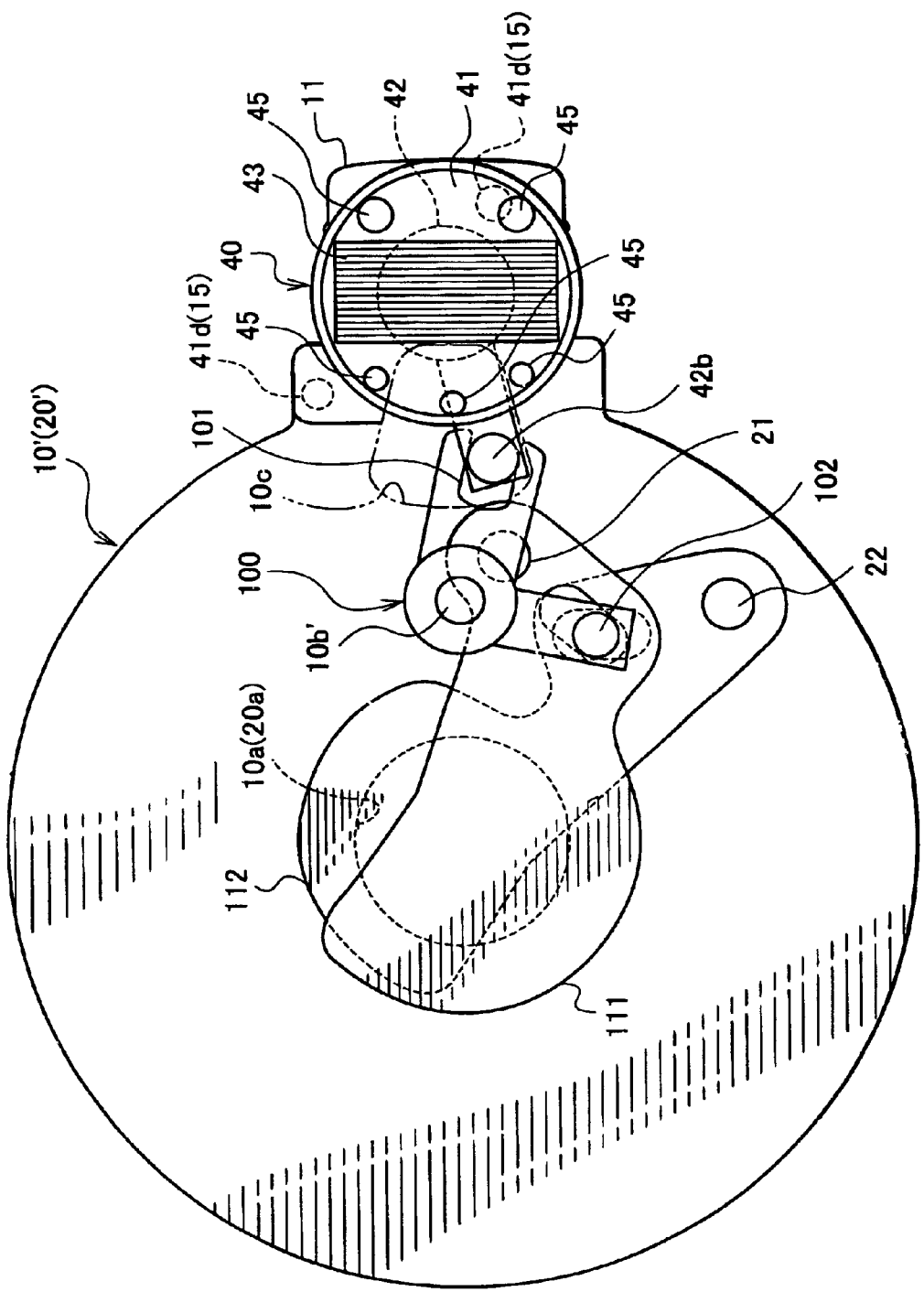
FIG. 8 is a plan view that shows a state where the pair of shutter blades close the aperture in the device of FIG. 6.

FIG. 6 through FIG. 8 show a shutter device for use in a camera which is another embodiment of a camera blade driving device according to the present invention. In this embodiment, a pair of shutter blades 110 are driven by a single electromagnetic actuator 40. The same reference characters are given to the same constituent elements as in the aforementioned embodiment, and a description of the same constituent elements is omitted.

As shown in FIG. 6 through FIG. 8, this device has a main plate 10' and a back plate 20' that constitute a base plate having exposure apertures 10a and 20a, a connecting arm 100 supported pivotably on a supporting shaft 10b' on the main plate 10', a pair of shutter blades 110 (111,112) used as blades that are supported pivotably on supporting shafts 21 and 22, respectively, on the back plate 20' and that are capable of blocking light passing through the apertures 10a and 20a while facing the apertures 10a and 20a, and an electromagnetic actuator 40.

As shown in FIG. 7 and FIG. 8, the connecting arm 100 is shaped substantially like an "L." An end of the connecting arm 100 has a U-shaped notch 101 that accepts the driving pin 42b, and the other end of the connecting arm 100 has a connection pin 102 that is connected to the pair of shutter blades 110.

The pair of shutter blades 110 consist of a shutter blade 111 and a shutter blade 112. The shutter blades 111 and 112 have circular holes 111a and 112a and long holes 111b and 112b, respectively. The supporting shafts 21 and 22 are inserted into the circular holes 111a and 112a, respectively, and the connection pin 102 is inserted into the long holes 111b and 112b.

Accordingly, the pair of shutter blades 110 are supported pivotably on the supporting shafts 21 and 22, and the apertures 10a and 20a are opened and closed when the driving pin 42b reciprocates within a predetermined range, and the connecting arm 100 swings in response to this reciprocation.

Next, a brief description will be given of the operation of this device in a case in which the device is carried on a digital camera. As shown in FIG. 7, the rotor 42 is first situated at a counterclockwise rotational end and is held by a magnetic urging force of, for example, the iron pin 45 when the coil 43 is not energized. At this time, the pair of shutter blades 110 (111, 112) open the apertures 10a and 20a.

When a photographer releases the shutter in this standby state, the coil 43 is energized, and the rotor 42 rotates as shown in FIG. 8, so that the pair of shutter blades 110 close the apertures 10a and 20a. An exposure operation is performed by a closing movement of the pair of shutter blades 110, a photographic image taken by a CCD is then subjected to various processings and is stored in a storage unit, and the photography is completed. Thereafter, the rotor 42 rotates in an opposite direction by passing the electric current in the opposite direction, and the pair of shutter blades 110 return to the position to open the apertures 10a and 20a and are held there.

In this device, as in the aforementioned device, since the rotor 42 is rotatably supported by the frame member 41 and the base plate (main plate) 10' (projection 11), and the coil 43 is wound onto the frame member 41 and the base plate (main plate) 10' (projection 11), the electromagnetic actuator 40 can be simultaneously assembled in a step of attaching various components to the main plate 10'.

In other words, unlike the conventional device, the number of necessary frame members is only one, and a fastening component like a screw is not needed,because the frame member 41 is joined to the main plate 10' by fitting and is further fastened by the coil 43. Therefore, the number of components can be lessened, the structure can be simplified, costs can be reduced, and the structure of the electromagnetic actuator 40 can be simplified to reduce its height. Therefore, the shutter device can be reduced in size (in thickness).

Furthermore, the rotor 42 (the driving pin 42b) is disposed so that the center of the angular range where the rotor 42 rotates exists substantially on the straight line L passing through the center of the aperture 10a and extending in the radial direction, and the coil 43 is wound in the direction substantially perpendicular to the straight line L. Therefore, the angular range where the rotor 42 rotates can be set to be greater.

Figure 9:
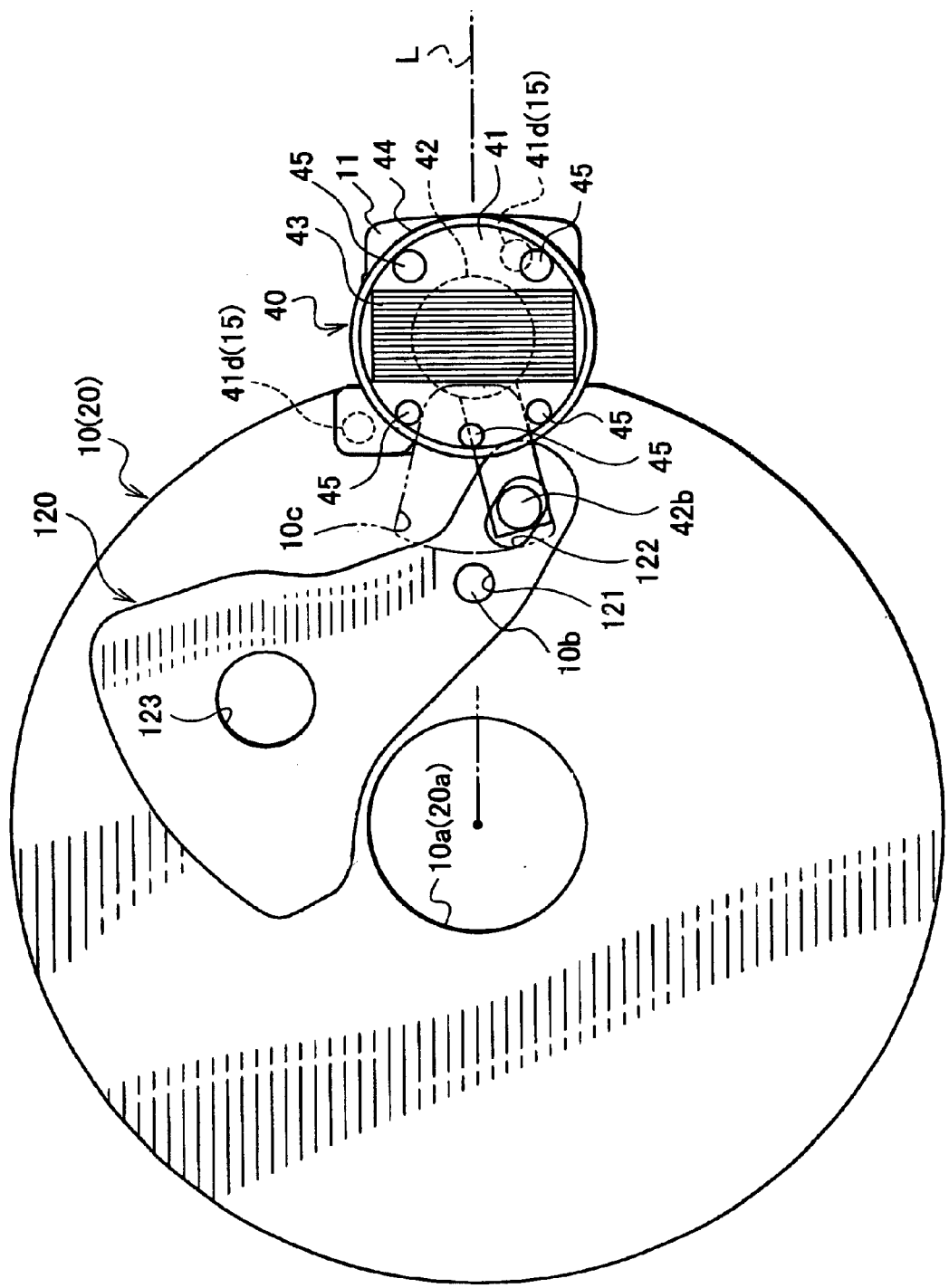
FIG. 9 shows still another embodiment of a camera blade driving device according to the present invention, showing a plan view of a state where the diaphragm blade opens the aperture.
Figure 10:
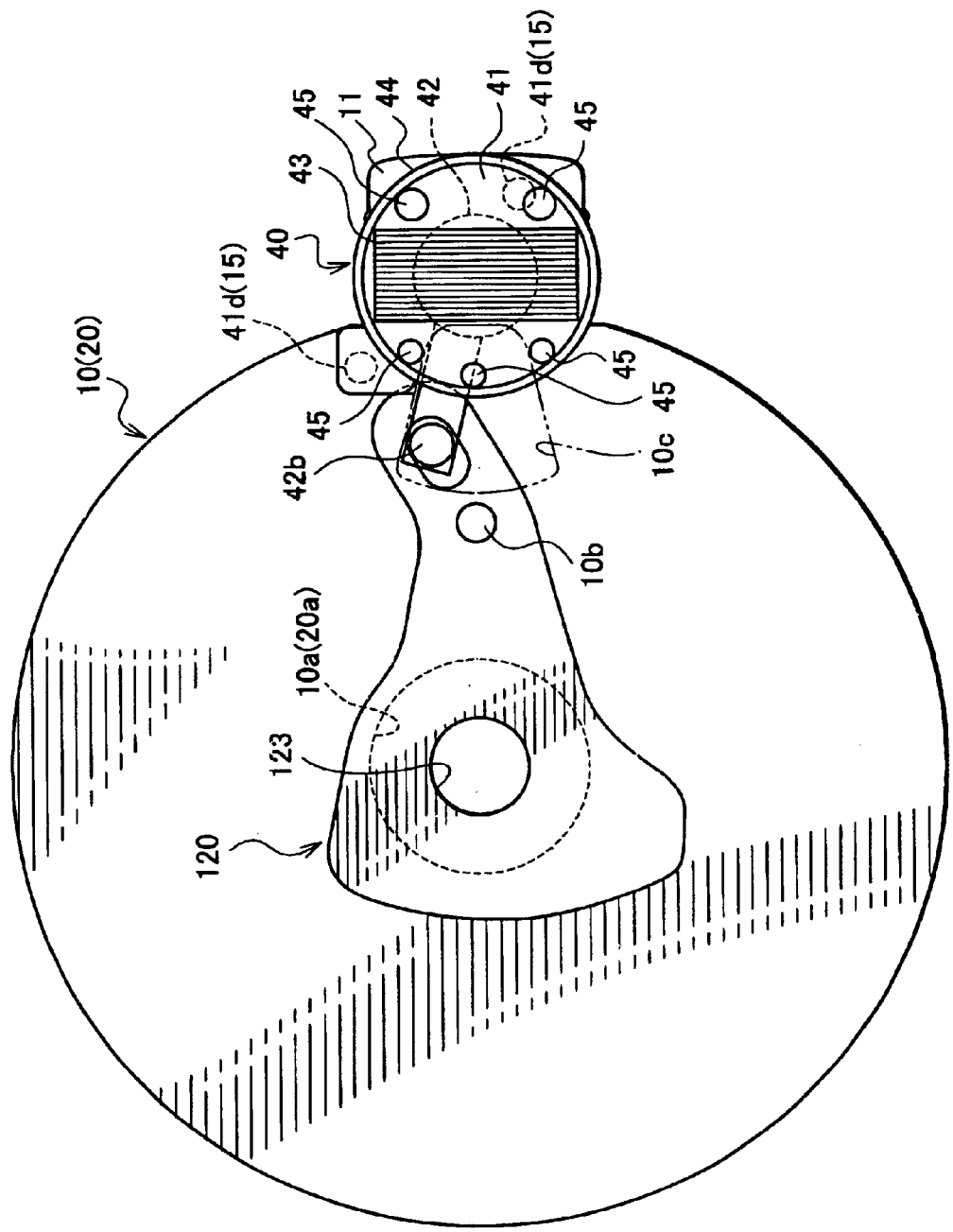
FIG. 10 is a plan view that shows a state where the diaphragm blade stops down the aperture to have a predetermined aperture diameter in the device of FIG. 9.

FIG. 9 and FIG. 10 show a diaphragm device for use in a camera, which is still another embodiment of a camera blade driving device according to the present invention. In this embodiment, a single diaphragm blade 120 is driven by a single electromagnetic actuator 40. The same reference characters are given to the same constituent elements as in the aforementioned embodiments, and a description of the same constituent elements is omitted.

As shown in FIG. 9 and FIG. 10, this device has a main plate 10 and a back plate 20 that constitute a base plate having exposure apertures 10a and 20a, a single diaphragm blade 120 used as a blade that is supported pivotably on a supporting shaft 10b on the main plate 10 and capable of blocking part of light passing through the exposure apertures 10a and 20a while facing the apertures 10a and 20a, and an electromagnetic actuator 40.

The single diaphragm blade 120 has a circular hole 121, a long hole 122, and a diaphragm aperture 123. The supporting shaft 10b is inserted into the circular hole 121, and the driving pin 42b is inserted into the long hole 122. Accordingly, the single diaphragm blade 120 supported pivotably on the supporting shaft 10b stops down the apertures 10a and 20a to have a predetermined aperture diameter by allowing the driving pin 42b to reciprocate within a predetermined range.

Next, a brief description will be given of the operation of this device in a case in which the device is carried on a digital camera. When a main switch of the camera is turned on, the CCD is turned on, and a photographic image is displayed on a monitor. Based on an image signal of the CCD, the intensity of illumination of a photographic subject is detected, and a control circuit emits a driving signal to adjust the amount of light toward the electromagnetic actuator 40.

That is, the coil 43 is energized, and the rotor 42 is appropriately rotated so that the amount of subject light passing through the apertures 10a and 20a may become optimum. As a result, the diaphragm blade 120 is automatically driven to the non-stopping-down position shown in FIG. 9 or the stopping-down position shown in FIG. 10.

In this device, as in the aforementioned device, since the rotor 42 is rotatably supported by the frame member 41 and the base plate (main plate) 10 (projection 11), and the coil 43 is wound onto the frame member 41 and the base plate (main plate) 10 (projection 11), the electromagnetic actuator 40 can be simultaneously assembled in a step of attaching various components to the main plate 10.

In other words, unlike the conventional device, the number of necessary frame members is only one, and a fastening component like a screw is not needed, because the frame member 41 is joined to the main plate 10 by fitting and is further fastened by the coil 43. Therefore, the number of components can be lessened, the structure can be simplified, costs can be reduced, and the structure of the electromagnetic actuator 40 can be simplified to reduce its height. Therefore, the diaphragm device can be reduced in size (in thickness).

Furthermore, the rotor 42 (the driving pin 42b) is disposed so that the center of the angular range where the rotor 42 rotates exists substantially on the straight line L passing through the center of the aperture 10a and extending in the radial direction, and the coil 43 is wound in the direction substantially perpendicular to the straight line L. Therefore, the angular range where the rotor 42 rotates can be set to be greater.

Figure 11:
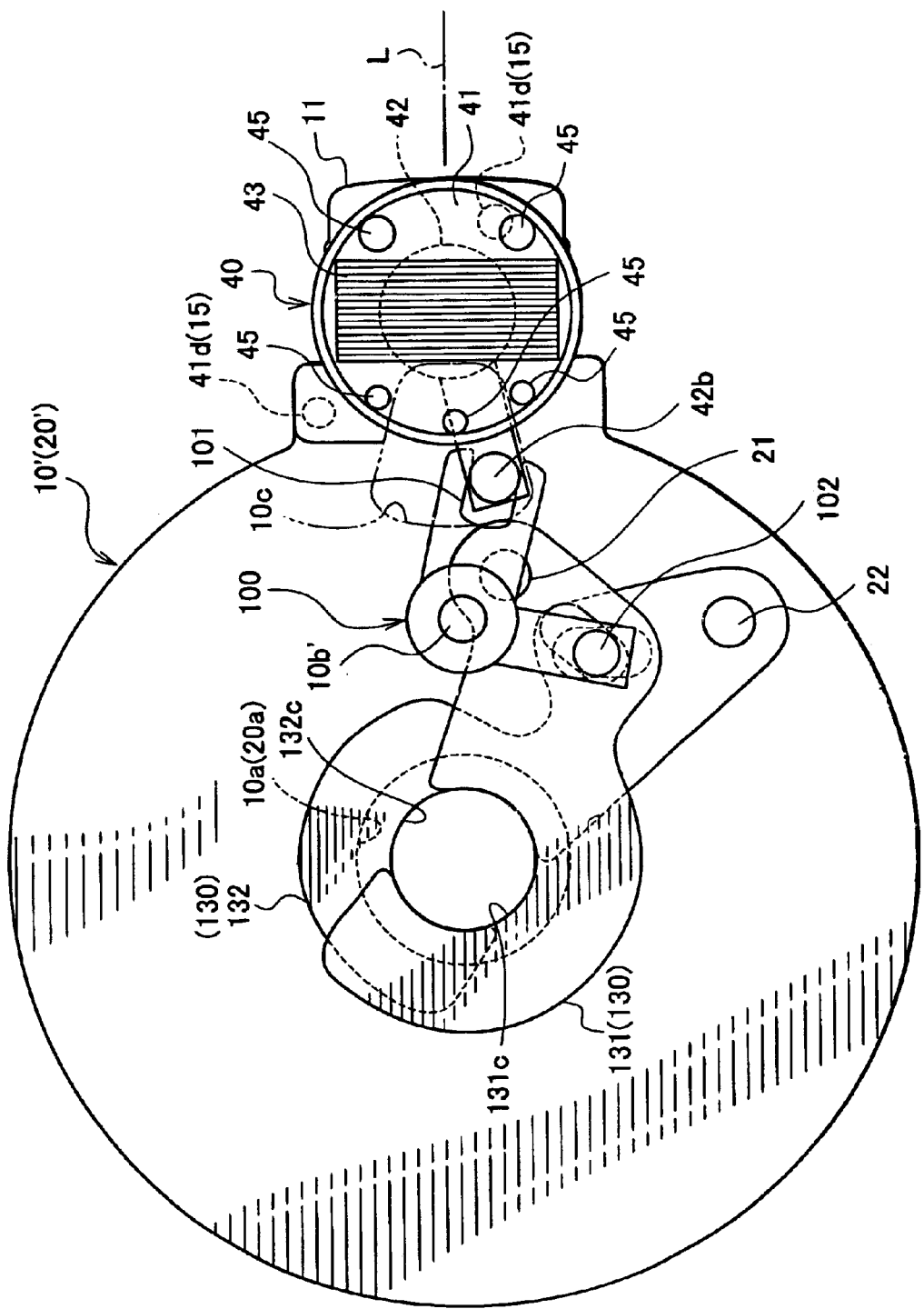
FIG. 11 shows still another embodiment of a camera blade driving device according to the present invention, showing a plan view of a state where the pair of diaphragm blades stop down the aperture to have a predetermined aperture diameter.

FIG. 11 shows a camera diaphragm device for use in a camera, which is another embodiment of a camera blade driving device according to the present invention. In this embodiment, a pair of diaphragm blades 130 are driven by a single electromagnetic actuator 40. The same reference characters are given to the same constituent elements as in the aforementioned embodiment shown in FIG. 6 through FIG. 8, and a description of the same constituent elements is omitted. Also, a description of the operation is omitted because of the same operation.

As shown in FIG. 11, this device has a main plate 10' and a back plate 20' that constitute a base plate having exposure apertures 10a and 20a, a connecting arm 100 supported pivotably on a supporting shaft 10b' on the main plate 10', a pair of diaphragm blades 130 (131,132) used as blades that are supported pivotably on supporting shafts 21 and 22, respectively, on the back plate 20' and that are capable of blocking part of light passing through the exposure apertures 10a and 20a while facing the apertures 10a and 20a, and an electromagnetic actuator 40.

In this device, as in the aforementioned device, unlike the conventional device, the number of necessary frame members is only one, and a fastening component like a screw is not needed, because the frame member 41 is joined to the main plate 10' by fitting and is further fastened by the coil 43. Therefore, the number of components can be lessened, the structure can be simplified, costs can be reduced, and the structure of the electromagnetic actuator 40 can be simplified to reduce its height. Therefore, the shutter device can be reduced in size (in thickness).

Furthermore, the rotor 42 (the driving pin 42b) is disposed so that the center of the angular range where the rotor 42 rotates exists substantially on the straight line L passing through the center of the aperture 10a and extending in the radial direction, and the coil 43 is wound in the direction substantially perpendicular to the straight line L. Therefore, the angular range where the rotor 42 rotates can be set to be greater.

Figure 12:
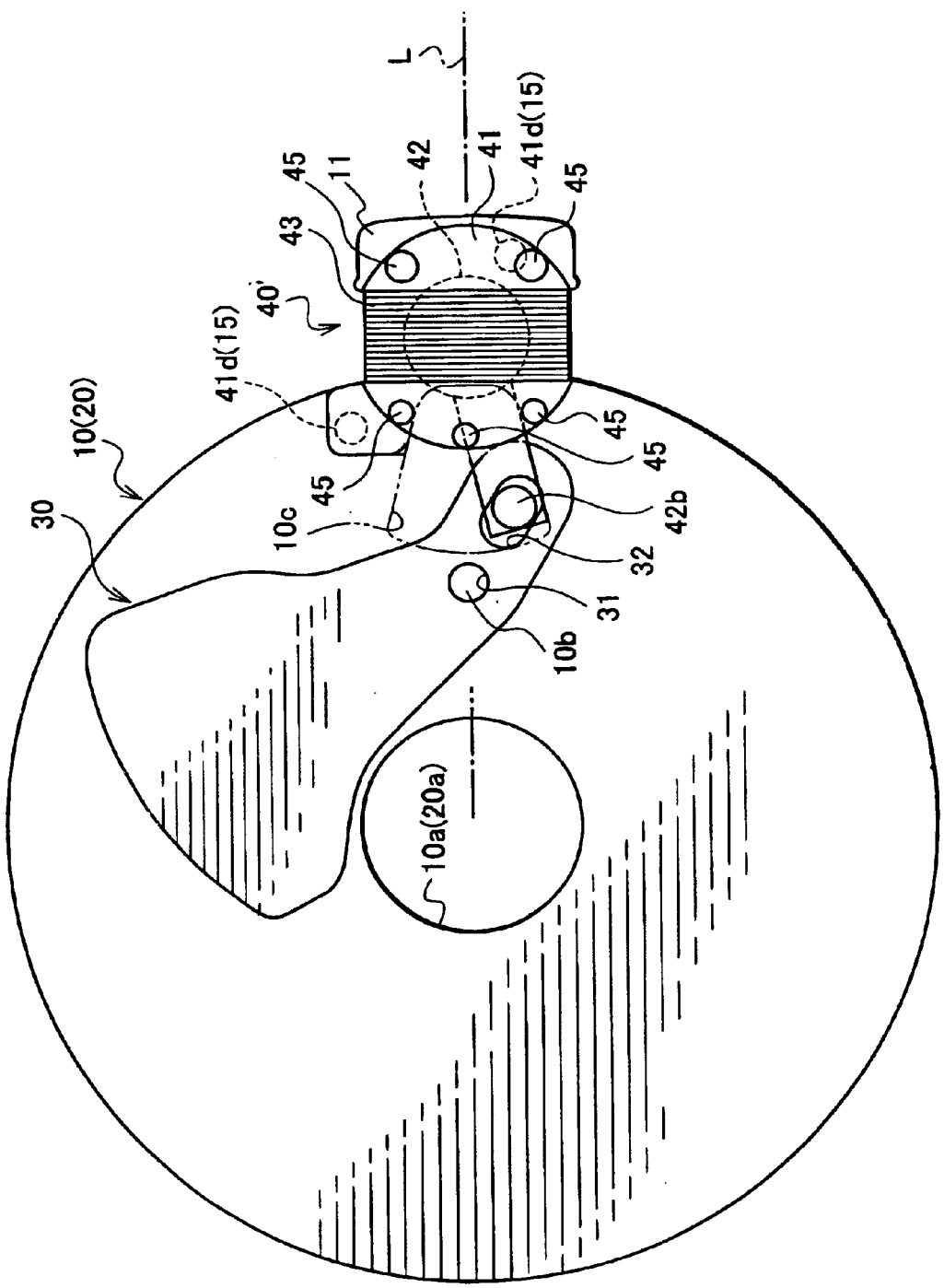
FIG. 12 is a plan view that shows still another embodiment of a camera blade driving device according to the present invention.

FIG. 12 shows a camera shutter device for use in a camera, which is another embodiment of a camera blade driving device according to the present invention. In this embodiment, an electromagnetic actuator 40' that does not include a yoke is employed. The same reference characters are given to the same constituent elements as in the aforementioned embodiment shown in FIG. 2, and a description of the same constituent elements is omitted. Also, a description of the operation is omitted because of the same operation.

As shown in FIG. 12, this device has a main plate 10 and a back plate 20 that constitute a base plate having exposure apertures 10a and 20a, a single shutter blade 30 supported pivotably on a supporting shaft 10b on the main plate 10 and serving as a blade that blocks light passing through the exposure apertures 10a and 20a while facing the apertures 10a and 20a, and an electromagnetic actuator 40' that drives the shutter blade 30.

As shown in FIG. 12, the electromagnetic actuator 40' is made up of a frame member 41 connected to the main plate 10, the rotor 42 having the driving pin 42b and the magnet portion 42a magnetized to have N and S poles, the magnetizing coil 43, and iron pins 45.

In this device, as in the aforementioned device, unlike the conventional device, the number of necessary frame members is only one, and a fastening component like a screw is not needed, because the frame member 41 is joined to the main plate 10 by fitting and is further fastened by the coil 43. Therefore, the number of components can be lessened, the structure can be simplified, costs can be reduced, and the structure of the electromagnetic actuator 40' can be simplified to reduce its height. Therefore, the shutter device can be reduced in size (in thickness).

Furthermore, the rotor 42 (the driving pin 42b) is disposed so that the center of the angular range where the rotor 42 rotates exists substantially on the straight line L passing through the center of the aperture 10a and extending in the radial direction, and the coil 43 is wound in the direction substantially perpendicular to the straight line L. Therefore, the angular range where the rotor 42 rotates can be set to be greater.

In the aforementioned embodiments, a structure has been employed in which the projection 11 is provided on the base plate (main plate) 10 shaped like a substantially circular disk, and the frame member 41 is joined to the projection 11. However, another structure may be employed in which the base plate has an outline of not a substantially circular shape but a substantially rectangular shape or the like, and is formed so that a part thereof defines a projection, to which the frame member 41 is joined.

Furthermore, in the aforementioned embodiments, a structure has been shown in which the single electromagnetic actuator 40 (40') is attached to the base plate 10. However, the present invention is not limited to this. A structure in which a plurality of electromagnetic actuators 40 (40') that drive a plurality of blades, respectively, are installed can be included within the scope of the present invention.

As described above, according to the camera blade driving device for use in a camera of the present invention, the frame member is joined directly to the base plate so that one end of the rotor can be supported by the frame member, and the other end on the rotor can be supported by the base plate (projection) having an exposure aperture, and the coil is wound onto the frame member and the base plate, and the the electromagnetic actuator is attached to the base plate. Therefore, the electromagnetic actuator can be simultaneously assembled in the step of attaching various components to the base plate, and a manufacturing procedure can be simplified.

Additionally, unlike the conventional device, the number of necessary frame members is only one, and a fastening component like a screw is not needed, because the coil is wound onto the frame member and the base plate. Therefore, the number of components can be lessened, the structure can be simplified, and costs can be reduced. Additionally, the electromagnetic actuator can be reduced in height, and, accordingly, the driving device can be reduced in size (in thickness).

What is claimed is:

1. A camera blade driving device for use in a camera comprising:
    a base plate having an exposure aperture;
    a blade supported pivotably on a supporting shaft on the base plate and capable of blocking part or all of light passing through the aperture while facing the aperture; and
    an electromagnetic actuator for driving the blade, the electromagnetic actuator having:
        a frame member joined to the base plate;
        a rotor one end of which is supported by the frame member and an opposite end of which is supported by the base plate, the rotor having a driving pin by which a driving force is exerted onto the blade, the rotor rotating within a predetermined angular range;
        a magnetizing coil wound onto the frame member and the base plate; and
        a yoke provided outside the coil substantially coaxially with the rotor.

2. The camera blade driving device as set forth in claim 1, wherein
    one of the frame member and the base plate has a fitting convex portion used to connect the frame member and the base plate together by fitting, and
    the other one of the frame member and the base plate has a fitting concave portion to accept the fitting convex portion.

3. The camera blade driving device as set forth in claim 1, wherein
    the base plate has a projection protruding outward in a radial direction with respect to the aperture,
    the frame member is connected to the projection so as to rotatably support the rotor in cooperation with the projection, and
    the coil is wound so as to fasten the frame member onto the projection.

4. The camera blade driving device as set forth in claim 1, wherein
    the rotor is disposed so that a center of an angular range where the rotor rotates is situated substantially on a straight line passing through a center of the aperture and extending in a radial direction, and
    the coil is wound in a direction substantially perpendicular to the straight line.

5. The camera blade driving device as set forth in claim 1, wherein
    the blade is a single shutter blade or a single diaphragm blade used to open and close the aperture, and
    the driving pin is connected directly to the single shutter blade or the single diaphragm blade.

6. The camera blade driving device as set forth in claim 1, wherein
    the blade is a pair of shutter blades or a pair of diaphragm blades used to open and close the aperture, and
    the driving pin is connected to the pair of shutter blades or the pair of diaphragm blades through a connecting arm swingably supported by the base plate.

7. A camera blade driving device for use in a camera comprising:

a base plate having an exposure aperture;

a blade supported pivotably on a supporting shaft on the base plate and capable of blocking part or all of light passing through the aperture while facing the aperture; and an electromagnetic actuator for driving the blade, the electromagnetic actuator having:

a frame member joined to the base plate;

a rotor one end of which is supported by the frame member and an opposite end of which is supported by the base plate, the rotor having a driving pin by which a driving force is exerted onto the blade, the rotor rotating within a predetermined angular range; and a magnetizing coil wound onto the frame member and the base plate.

* * * * *